(12) United States Patent
Ichiki et al.

(10) Patent No.: US 12,691,785 B2
(45) Date of Patent: Jul. 28, 2026

(54) BATTERY MANAGEMENT DEVICE FOR ELECTRIC VEHICLE

(71) Applicant: SUBARU CORPORATION, Tokyo (JP)

(72) Inventors: Toshiyuki Ichiki, Tokyo (JP); Hiroshi Abe, Tokyo (JP); Hiroshi Kusano, Tokyo (JP); Daichi Akiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 383 days.

(21) Appl. No.: 18/450,721

(22) Filed: Aug. 16, 2023

(65) Prior Publication Data

US 2024/0067043 A1      Feb. 29, 2024

(30) Foreign Application Priority Data

Aug. 26, 2022     (JP) ................................. 2022-135046

(51) Int. Cl.
B60L 58/13          (2019.01)
B60L 50/60          (2019.01)
            (Continued)

(52) U.S. Cl.
CPC ............... B60L 58/13 (2019.02); B60L 50/60 (2019.02); H01M 10/425 (2013.01);
            (Continued)

(58) Field of Classification Search
None
See application file for complete search history.

(56) References Cited

U.S. PATENT DOCUMENTS 11,628,743 B2 *   4/2023   Feng ....................... B60L 58/22
                                                    320/134
2007/0013347 A1 *  1/2007   Kamohara ............... B60K 6/48
                                                    320/160
(Continued)

FOREIGN PATENT DOCUMENTS

JP          2015-052513  A       3/2015
JP          2017-133870  A       8/2017
            (Continued)

OTHER PUBLICATIONS

Office Action issued on Mar. 31, 2026 in the corresponding Japanese patent application No. 2022-135046, w/ English Translation.

*Primary Examiner* — Hua Lu
(74) *Attorney, Agent, or Firm* — Rimon P.C.

(57)          ABSTRACT

A battery management device to be mounted on an electric vehicle including a driving wheel, a traveling motor configured to generate a driving force for the driving wheel, and a battery configured to store electric power to be consumed by the traveling motor. The battery management device includes a detector configured to detect a state of the battery, and a controller configured to calculate a characteristic value indicating performance of the battery based on an output of the detector, and manage charging and discharging of the battery based on the characteristic value. The controller is configured to, when the characteristic value has deterioration, determine whether the deterioration of the characteristic value is reversible deterioration based on the output of the detector. The controller is configured to, upon determining that the deterioration of the characteristic value is the reversible deterioration, return the characteristic value to a value before the deterioration.

11 Claims, 8 Drawing Sheets

(51) Int. Cl.
     *H01M 10/42*      (2006.01)
     *H01M 10/46*      (2006.01)
     *H01M 10/48*      (2006.01)

(52) U.S. Cl.
     CPC ........... *H01M 10/46* (2013.01); *H01M 10/48*
     (2013.01); *H01M 2010/4271* (2013.01); *H01M*
     *2220/20* (2013.01)

(56) References Cited

U.S. PATENT DOCUMENTS

| | | | | |
|---|---|---|---|---|
| 2015/0301123 A1* | 10/2015 | Tao | ...................... | G01R 31/392 |
| | | | | 324/426 |
| 2016/0061908 A1* | 3/2016 | Torai | .................. | G01R 31/3648 |
| | | | | 702/63 |
| 2016/0380281 A1* | 12/2016 | Im | ..................... | H01M 8/04753 |
| | | | | 429/432 |
| 2018/0095135 A1* | 4/2018 | Kawasaki | ........... | G01R 31/371 |
| 2018/0241097 A1* | 8/2018 | Yamasaki | ........... | H01M 10/441 |
| 2018/0264956 A1* | 9/2018 | Takagi | .................... | H02J 7/933 |
| 2019/0023147 A1* | 1/2019 | Komiyama | ............. | H02J 7/933 |
| 2019/0044345 A1* | 2/2019 | Komiyama | ............. | H02J 7/933 |
| 2019/0202299 A1* | 7/2019 | Oh | ..................... | H01M 10/425 |
| 2020/0099235 A1 | 3/2020 | Ito et al. | | |
| 2022/0075000 A1* | 3/2022 | Cha | ...................... | G01R 31/392 |

| | | | | |
|---|---|---|---|---|
| 2022/0413058 A1 | 12/2022 | Kim et al. | | |
| 2023/0014689 A1* | 1/2023 | Ogasawara | .......... | G01R 31/392 |
| 2023/0025959 A1* | 1/2023 | Lee | ....................... | H01M 4/366 |
| 2023/0039356 A1* | 2/2023 | Jee | ..................... | H01M 10/052 |
| 2023/0091006 A1* | 3/2023 | Lee | ........................ | H01M 4/134 |
| | | | | 429/232 |
| 2023/0184843 A1* | 6/2023 | Bae | .................... | G01R 31/3835 |
| | | | | 324/426 |
| 2023/0221373 A1* | 7/2023 | Deng | ................. | G01R 31/3835 |
| | | | | 324/433 |
| 2023/0231209 A1* | 7/2023 | Yamagami | ........... | G01R 31/389 |
| | | | | 320/134 |
| 2023/0324471 A1* | 10/2023 | Umemoto | ........... | G01R 31/396 |
| | | | | 702/63 |
| 2024/0044994 A1* | 2/2024 | Hirai | .................... | G01R 31/392 |
| 2024/0106257 A1* | 3/2024 | Numada | .................. | H02J 7/82 |
| 2025/0210643 A1* | 6/2025 | Esaki | .................... | H01M 4/505 |

FOREIGN PATENT DOCUMENTS

| | | |
|---|---|---|
| JP | 2018-147665 A | 9/2018 |
| JP | 2018-169237 A | 11/2018 |
| JP | 2019-096552 A | 6/2019 |
| JP | 2020-053240 A | 4/2020 |
| JP | 2021-069142 A | 4/2021 |
| JP | 2021-533371 A | 12/2021 |
| JP | 2022-021070 A | 2/2022 |

* cited by examiner

BATTERY MANAGEMENT DEVICE FOR ELECTRIC VEHICLE

CROSS-REFERENCE TO RELATED APPLICATIONS

The present application claims priority from Japanese Patent Application No. 2022-135046 filed on Aug. 26, 2022, the entire contents of which are hereby incorporated by reference.

BACKGROUND

The disclosure relates to a battery management device for an electric vehicle.

Japanese Unexamined Patent Application Publication No. 2019-096552 describes a battery deterioration determination system that determines that a battery has deterioration other than high-rate deterioration based on a change in a peak position in a dQ/dV characteristic line of the battery.

SUMMARY

An aspect of the disclosure provides a battery management device to be mounted on an electric vehicle. The battery management device includes a driving wheel, a traveling motor, and a battery. The traveling motor is configured to generate a driving force for the driving wheel. The battery is configured to store electric power to be consumed by the traveling motor. The battery management device includes a detector and a controller. The detector is configured to detect a state of the battery. The controller is configured to calculate a characteristic value indicating performance of the battery based on an output of the detector, and manage charging and discharging of the battery based on the characteristic value. The controller is configured to, when the characteristic value has deterioration, determine whether the deterioration of the characteristic value is reversible deterioration based on the output of the detector. The controller is configured to, upon determining that the deterioration of the characteristic value is the reversible deterioration, return the characteristic value to a value before the deterioration.

An aspect of the disclosure provides a battery management device to be mounted on an electric vehicle including a driving wheel, a traveling motor, and a battery. The traveling motor is configured to generate a driving force for the driving wheel. The battery is configured to store electric power to be consumed by the traveling motor. The battery management device includes circuitry. The circuitry is configured to detect a state of the battery. The circuitry is configured to calculate a characteristic value indicating performance of the battery based on the state of the battery, and manage charging and discharging of the battery based on the characteristic value. The circuitry is configured to, when the characteristic value has deterioration, determine whether the deterioration of the characteristic value is reversible deterioration based on the state of the battery. The circuitry is configured to, upon determining that the deterioration of the characteristic value is the reversible deterioration, return the characteristic value to a value before the deterioration.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In a battery management device, characteristic values (full charge level, internal resistance, etc.) indicating the performance of a battery are calculated. When the values are registered as control data for management, the charging and discharging of the battery are managed based on the registered values. The characteristic values of the battery gradually deteriorate over time or by use of the battery, but characteristic values recovered by errors may be calculated. When the recovered characteristic values are calculated, the related-art battery management device does not register the values as the control data for management.

In recent years, it is known that the characteristic values of the battery may temporarily deteriorate reversibly and may be recovered afterward. When the characteristic values of the battery are recovered but the charging and discharging of the battery are managed based on deteriorated characteristic values, the performance of the battery of the electric vehicle cannot be exerted sufficiently.

It is desirable to provide a battery management device for an electric vehicle that can sufficiently exert the performance of a battery.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
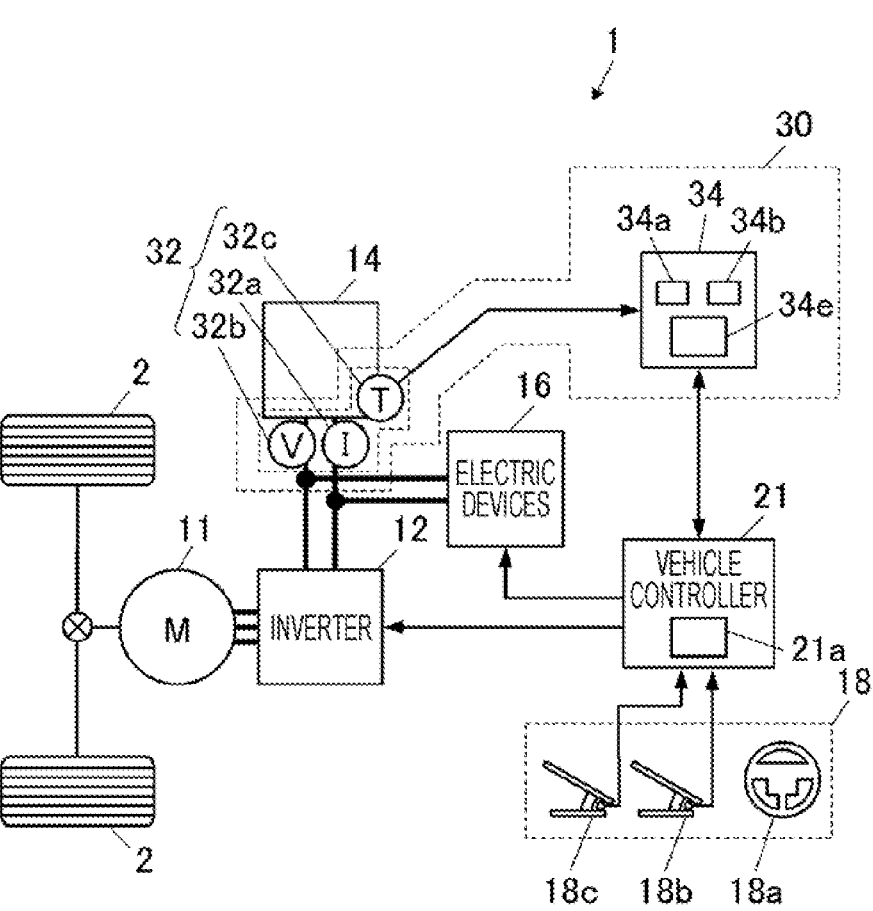
FIG. 1 is a block diagram illustrating an electric vehicle and a battery management device according to an embodiment of the disclosure.

FIG. 1 is a block diagram illustrating an electric vehicle and a battery management device according to the embodiment of the disclosure.

An electric vehicle 1 according to this embodiment includes driving wheels 2, a traveling motor 11 that generates a driving force to be transmitted to the driving wheels 2, an inverter 12 that drives the traveling motor 11, a battery 14 that stores electric power, electric devices 16 to be driven with the electric power of the battery 14, an operation unit 18 for driving operation, a vehicle controller 21 that controls the inverter 12 and the electric devices 16, and a battery management device 30 that manages the battery 14.

The operation unit 18 includes, for example, a steering operator 18a, an accelerator operator 18b, and a brake operator 18c. When the operation unit 18 is operated, the operation unit 18 sends an operation signal to the vehicle controller 21.

The vehicle controller 21 includes one electronic control unit (ECU) or multiple ECUs that operate in cooperation by communication. The vehicle controller 21 receives an operation signal from the operation unit 18. The vehicle controller 21 communicates with the battery management device 30. The vehicle controller 21 controls the inverter 12 based on the operation signal and communication data from the battery management device 30, and causes the traveling motor 11 to perform a power running operation or a regenerative operation under that control. The vehicle controller 21 can control drive of the electric devices 16.

During the power running operation, the traveling motor 11 consumes electric power of the battery 14. During the regenerative operation, electric power regenerated by the traveling motor 11 is sent to the battery 14 to charge the battery 14.

Examples of the electric devices 16 include a heater, a compressor, and a DC/DC converter that generates electric power for low-voltage devices. The electric devices 16 may be any other devices.

The battery management device 30 includes a detector 32 that detects the state of the battery 14. For example, the detector 32 includes a current sensor 32a and a voltage sensor 32b that detect a current and a voltage as the state of the battery 14. The detector 32 may include a temperature sensor 32c that detects a temperature as the state of the battery 14. The detector 32 is not limited to the detector that detects the current, voltage, and temperature of the battery 14, and may detect any electrical or physical variation as long as the detector can detect a state for calculation of values to be used for managing charging and discharging.

The battery management device 30 further includes a controller 34. The controller 34 includes one ECU, but may include multiple ECUs that operate in cooperation by communication. The controller 34 manages the charging and discharging of the battery 14 in response to detection results from the detector 32.

Characteristic values indicating the performance of the battery 14 deteriorate over time or by use of the battery 14. The performance includes a full charge level, outputtable power, and inputtable power. The characteristic values indicating the performance include an internal resistance. The full charge level is performance and is a characteristic value as well. The internal resistance corresponds to a characteristic value indicating the outputtable power and the inputtable power. When the internal resistance increases, the heat generation amount of the battery relative to input and output currents increases. Therefore, the outputtable power and the inputtable power decrease. The performance of the battery 14 and the characteristic values indicating the performance are not limited to those in this example, and may include any other amount or value.

The battery management device 30 manages the charging and discharging of the battery 14 within the range of the performance of the battery 14 based on the characteristic values. For example, the battery management device 30 manages the charging and discharging based on the full charge level of the battery 14 so that the state of charge (SOC) of the battery 14 does not reach 100% or higher and a very low value. The management is realized by, for example, causing the vehicle controller 21 to limit the output power of the traveling motor 11 at a low SOC of the battery 14 or to limit regenerative braking of the traveling motor 11 at a high SOC of the battery 14. The battery management device 30 sets the outputtable power and the inputtable power of the battery 14 based on the internal resistance of the battery 14, and causes the vehicle controller 21 to perform the power running operation or the regenerative operation of the traveling motor 11 so that the set outputtable power and the set inputtable power are not exceeded. The battery management device 30 may set the outputtable power and the inputtable power based on the temperature of the battery 14 in addition to the internal resistance.

The controller 34 may include storages 34a and 34b in which the characteristic values indicating the performance are registered. The controller 34 may manage the charging and discharging based on the characteristic values registered in the storages 34a and 34b instead of characteristic values calculated at each time or actual characteristic values. When the characteristic values change, the changes are not immediately reflected on the management of the charging and discharging. Therefore, the changes in the characteristic values may be reflected on the management of the charging and discharging when the characteristic values in the storages 34a and 34b are updated.

The characteristic values registered in the storages 34a and 34b or the performance of the battery 14 obtained from the characteristic values may be values sent to the vehicle controller 21 by communication. The full charge level registered in the storage 34a may be a value displayed on, for example, a display panel at a driver's seat or a mobile device of a user, or may be a value applied to calculation of a displayed SOC. Similarly, the value of the internal resistance registered in the storage 34b or the outputtable power and the inputtable power obtained from that value may be a value displayed on, for example, the display panel at the driver's seat or the mobile device of the user.

The controller 34 may update the values in the storages 34a and 34b every time the characteristic values are obtained or in accordance with predetermined conditions. For example, the internal resistance of the battery 14 fluctuates relatively greatly during the use of the battery 14, and can be calculated at a high frequency during the use of the battery 14. Since the value of the internal resistance registered in the storage 34b is used for determining the outputtable power and the inputtable power, a medium-to-long term averaged fluctuation excluding a short term fluctuation is desirably reflected on the value of the internal resistance. Therefore, the controller 34 may collect internal resistances of the battery 14 calculated at a high frequency, for example, in a predetermined cycle (predetermined period, predetermined number of operations, etc.), obtain an averaged internal resistance by statistical processing, and register the value of the averaged internal resistance in the storage 34b.

Characteristics of Battery

Figure 2:
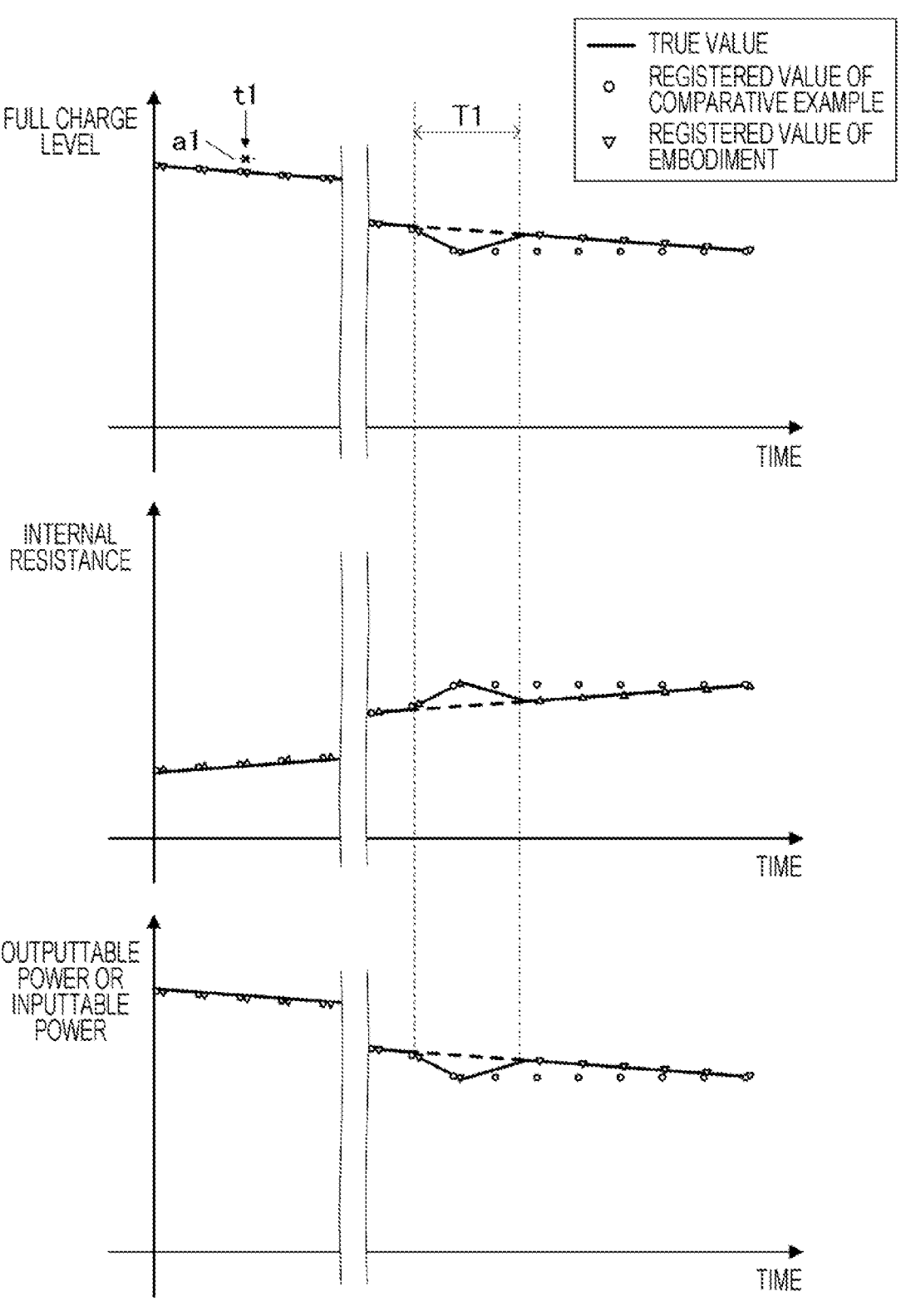
FIG. 2 is a time chart illustrating changes in characteristic values of a battery.

FIG. 2 is a time chart illustrating changes in the characteristic values of the battery. As illustrated in FIG. 2, the characteristic values (full charge level and internal resistance) and the performance (full charge level, outputtable power, and inputtable power) of the battery 14 deteriorate over time or by use of the battery 14. As indicated by a period T1, the characteristic values and the performance of the battery 14 may temporarily deteriorate and may be recovered afterward with an elapse of several hours or days. The deterioration that leads to recovery afterward is reversible deterioration. When the controller 34 calculates the characteristic values and the performance at any timing t1, a value al recovered from the previous value may be obtained due to an error.

It is assumed that a controller of a comparative example cannot determine whether an obtained value results from recovery after the reversible deterioration or variation caused by an error. Even when the value calculated as the characteristic value or the performance of the battery 14 is recovered from the previous value, the value may result from an error. Therefore, the controller of the comparative example has difficulty in using the recovered value for the management of the charging and discharging. When the recovered value is used for the management though the performance of the battery 14 is not recovered in actuality, the charging and discharging may be performed beyond the performance of the battery 14. Even though the recovered characteristic value is calculated, the controller of the comparative example does not update the characteristic value for the management, and manages the charging and discharging by using the pre-recovery characteristic value afterward.

In FIG. 2, the item "registered value of comparative example" is an example of a registered value of the characteristic value or the performance in a battery management device of the comparative example. The item "registered value of embodiment" is an example of a registered value of the characteristic value or the performance in the battery management device 30 of the embodiment. The term "registered value" means a value registered in the storage 34a or 34b and used by the controller 34 to manage the charging and discharging, or a performance value converted from that value. The "registered value" may differ from the true value of the characteristic value or the performance at each time.

As indicated by the period T1, the battery 14 of the comparative example is recovered after the reversible deterioration but the characteristic value at the time of reversible deterioration is used for managing the charging and discharging. Therefore, there is a possibility that the performance of the battery 14 is not exerted sufficiently. The controller 34 of the embodiment performs a process of determining whether the deterioration is the reversible deterioration. When the characteristic value is recovered after the reversible deterioration, the controller 34 can manage the charging and discharging by reflecting the recovered characteristic value. Thus, the performance of the battery 14 can be exerted sufficiently.

<Characteristics of Reversible Deterioration>

Figure 3:
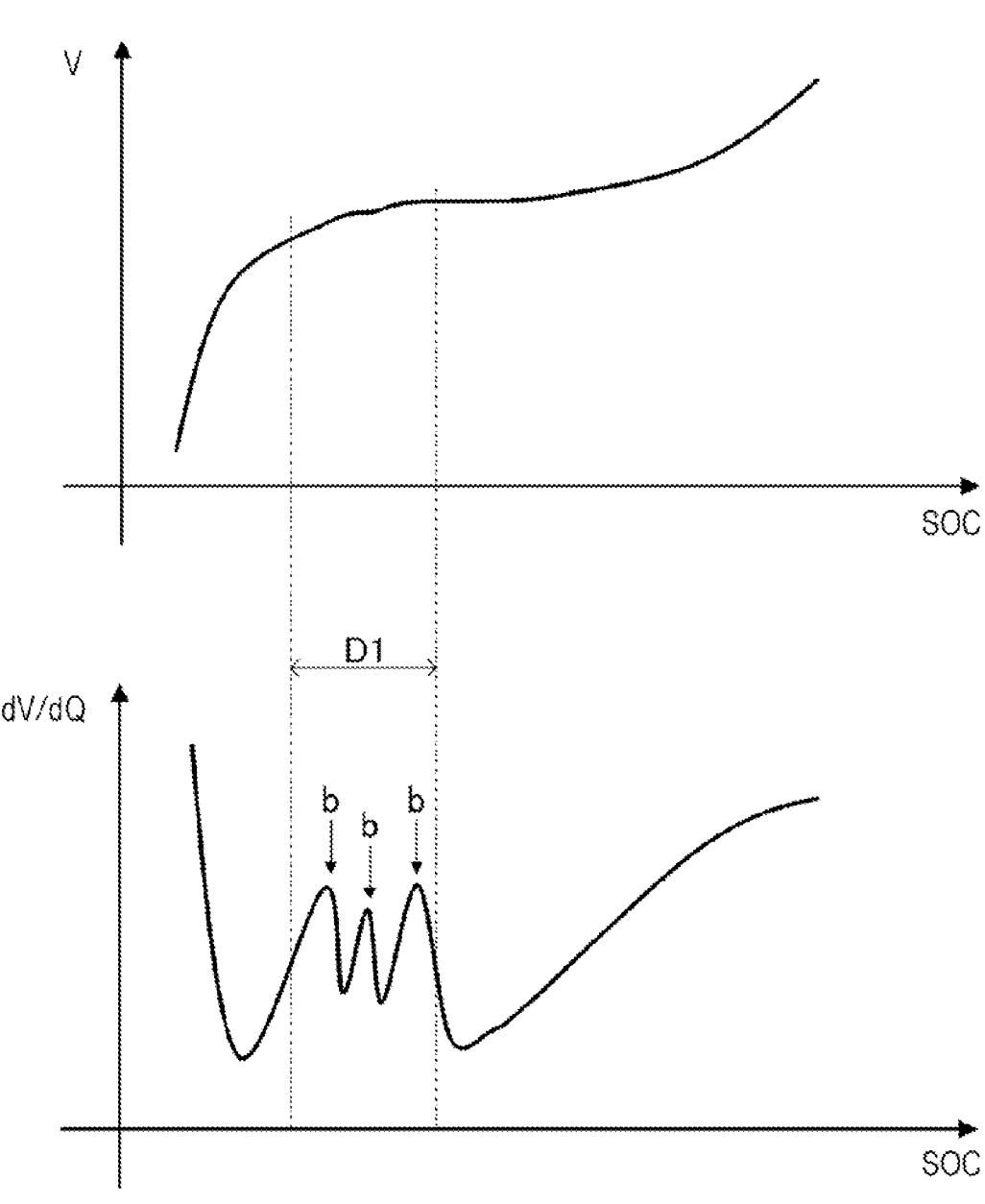
FIG. 3 is a diagram illustrating an example of a charging/discharging characteristic line of the battery.
Figure 4:
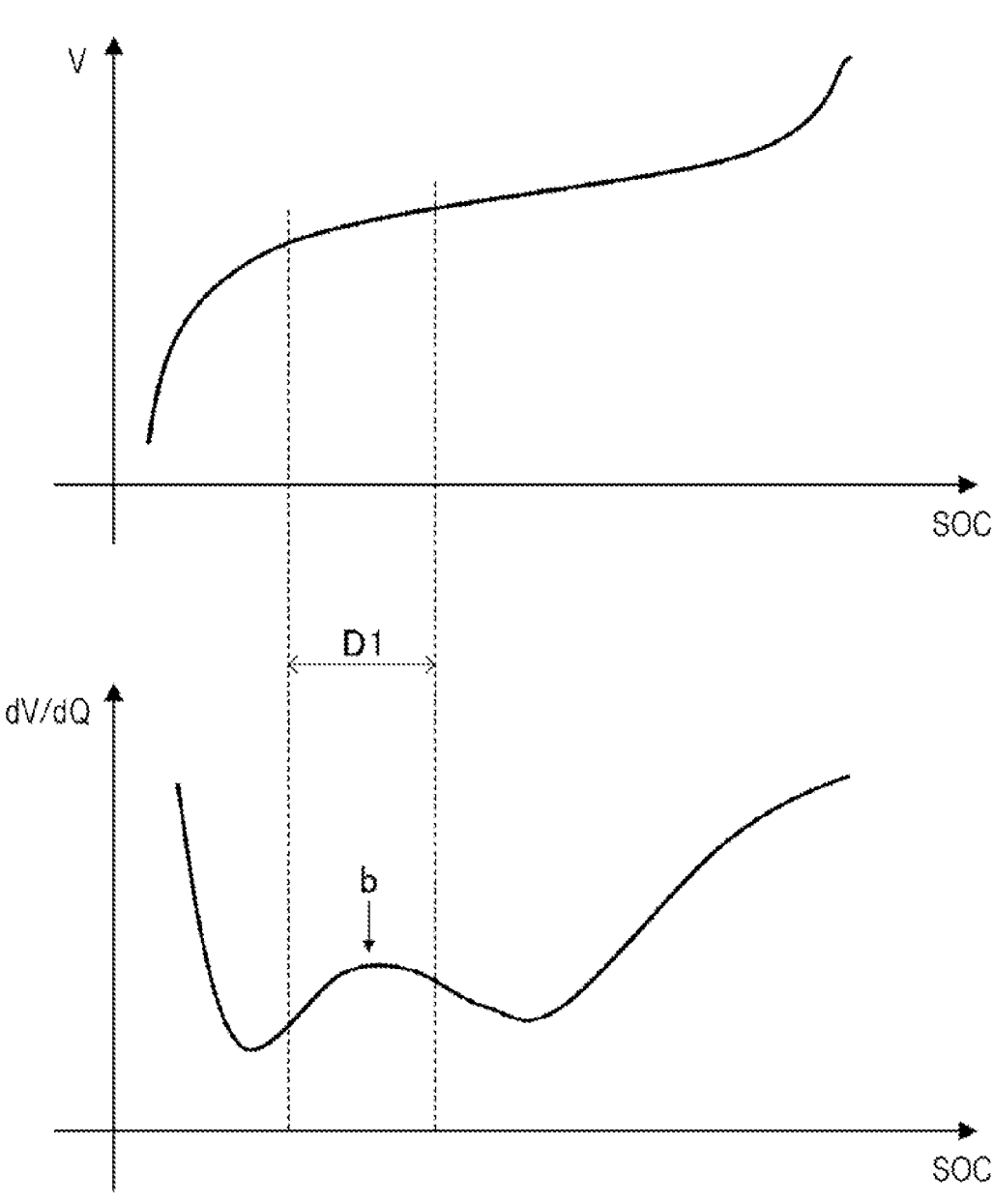
FIG. 4 is a diagram illustrating an example of a charging/discharging characteristic line of the battery in the event of reversible deterioration.

FIG. 3 is a diagram illustrating an example of a charging/discharging characteristic line of the battery. FIG. 4 is a diagram illustrating an example of a charging/discharging characteristic line of the battery in the event of reversible deterioration. FIG. 3 and FIG. 4 illustrate characteristic lines in a case where stable charging (for example, constant-current charging) is performed from a low SOC value to a high SOC value or in a case where stable discharging (for example, constant-current discharging) is performed from a high SOC value to a low SOC value. The symbol "V" represents a voltage (for example, a closed circuit voltage (CCV)). The symbol "Q" represents a power storage amount. The symbol "dV/dQ" represents differentiation of the voltage V by the power storage amount Q.

The battery 14 has a characteristic that multiple peaks b appear in a dV/dQ characteristic line in a first SOC range D1. Examples of the battery 14 having such a characteristic include a lithium ion secondary battery including a graphite-based anode.

The first SOC range D1 in which the peaks b appear is a predetermined range such as a range around an SOC of 20%, in which the value does not greatly change over time or by use of the battery. Depending on the structure of battery cells, the first SOC range D1 may be a different range such as a range around an SOC of 50%. The first SOC range D1 may be shifted so as to be predictable over time or by use of the battery.

When the battery 14 has reversible deterioration, the peaks b in the dV/dQ characteristic line change as illustrated in FIG. 4. For example, the number of the peaks b decreases and the sharpness of each peak b changes toward gentleness. When multiple peaks b are present, the deviation among the positions of the peaks b decreases. After the recovery from the reversible deterioration, the number and shape of the peaks b in the dV/dQ characteristic line return to the original number and shape illustrated in FIG. 3.

Reversible Deterioration Determination Process

The controller 34 determines, as a determination process, whether the peaks b in the dV/dQ characteristic line have changed, thereby determining whether the deterioration of the characteristic values and the performance is the reversible deterioration.

For example, the controller 34 determines, in the determination process, whether the number of the peaks has decreased to a number equal to or smaller than a threshold, the sharpness of each peak is equal to or smaller than a threshold, or the deviation among the positions of the peaks is equal to or smaller than a threshold. Alternatively, the controller 34 may determine whether two or three of the conditions are satisfied. When the result of the determination is "YES", the controller 34 determines that the deterioration is the reversible deterioration.

The change in the peaks b means a change from comparison-reference peaks b to observed peaks b. The comparison-reference peaks b are peaks b of the battery 14 in its initial state. The comparison-reference peaks b may be obtained by test or simulation, and the number and shape of the comparison-reference peaks b may be given to the controller 34 in advance. Alternatively, the comparison-reference peaks b may be peaks b in the dV/dQ characteristic line before observed by the controller 34 when the battery 14 is stably discharged or charged.

According to the determination process described above, when recovered characteristic values are obtained, the controller 34 can determine whether the recovered characteristic values result from recovery after the reversible deterioration or variation caused by errors. When determination is made that the recovered characteristic values result from the recovery after the reversible deterioration, the controller 34 can return the characteristic values for the management (characteristic values registered in the storages 34a and 34b) to the values before the deterioration, that is, the recovered characteristic values. Thus, the performance of the battery 14 can sufficiently be exerted afterward.

The controller 34 acquires the dV/dQ characteristic line in the first SOC range D1 to execute the determination process. Therefore, the controller 34 may execute the determination process when the possibility of the reversible deterioration is high as in a case where the deterioration advances fast based on the advance of the deterioration of the characteristic values of the battery 14. When executing the determination process, the controller 34 may transmit a request for charging or discharging in the first SOC range D1 to the vehicle controller 21 to promptly acquire the dV/dQ characteristic line in the first SOC range D1.

Based on the request, the vehicle controller 21 controls the traveling motor 11 and the electric devices 16 to perform the charging or discharging in the first SOC range D1 in parallel with vehicle control responding to driving operation. For example, when the SOC of the battery 14 is a value above the first SOC range D1, the vehicle controller 21 controls the traveling motor 11 or the electric devices 16 so that the SOC falls within or below the first SOC range D1 by consuming electric power. Through this control, the discharging in the first SOC range D1 is realized. When the SOC is higher than a lower limit of the first SOC range D1 and charging such as external charging is performed, the vehicle controller 21 or the controller 34 temporarily releases the electric power of the battery 14 to the outside (or causes the electric devices 16 or the like to use the electric power). The vehicle controller 21 or the controller 34 reduces the SOC to the lower limit of the first SOC range D1, and then charges the battery 14. Through this control, the charging in the first SOC range D1 is realized. Through the process described above, the controller 34 can promptly acquire the dV/dQ characteristic line in the first SOC range D1 and determine whether the deterioration is the reversible deterioration.

When the result of the determination process shows the reversible deterioration, the controller 34 may then calculate the characteristic values again and return the characteristic values for the management (characteristic values registered in the storages 34*a* and 34*b*) to the values before the deterioration, that is, the recovered values under the condition that the characteristic values are recovered. Alternatively, the controller 34 may then acquire the dV/dQ characteristic line again and return the characteristic values for the management to the recovered values before the deterioration under the condition that the peaks are returned to the original peaks in addition to the condition described above. Through this process, it is possible to reduce the occurrence of a case where the characteristic values for the management are returned to the recovered values before the battery 14 is actually recovered.

Charging/Discharging Management Process

Figure 5:
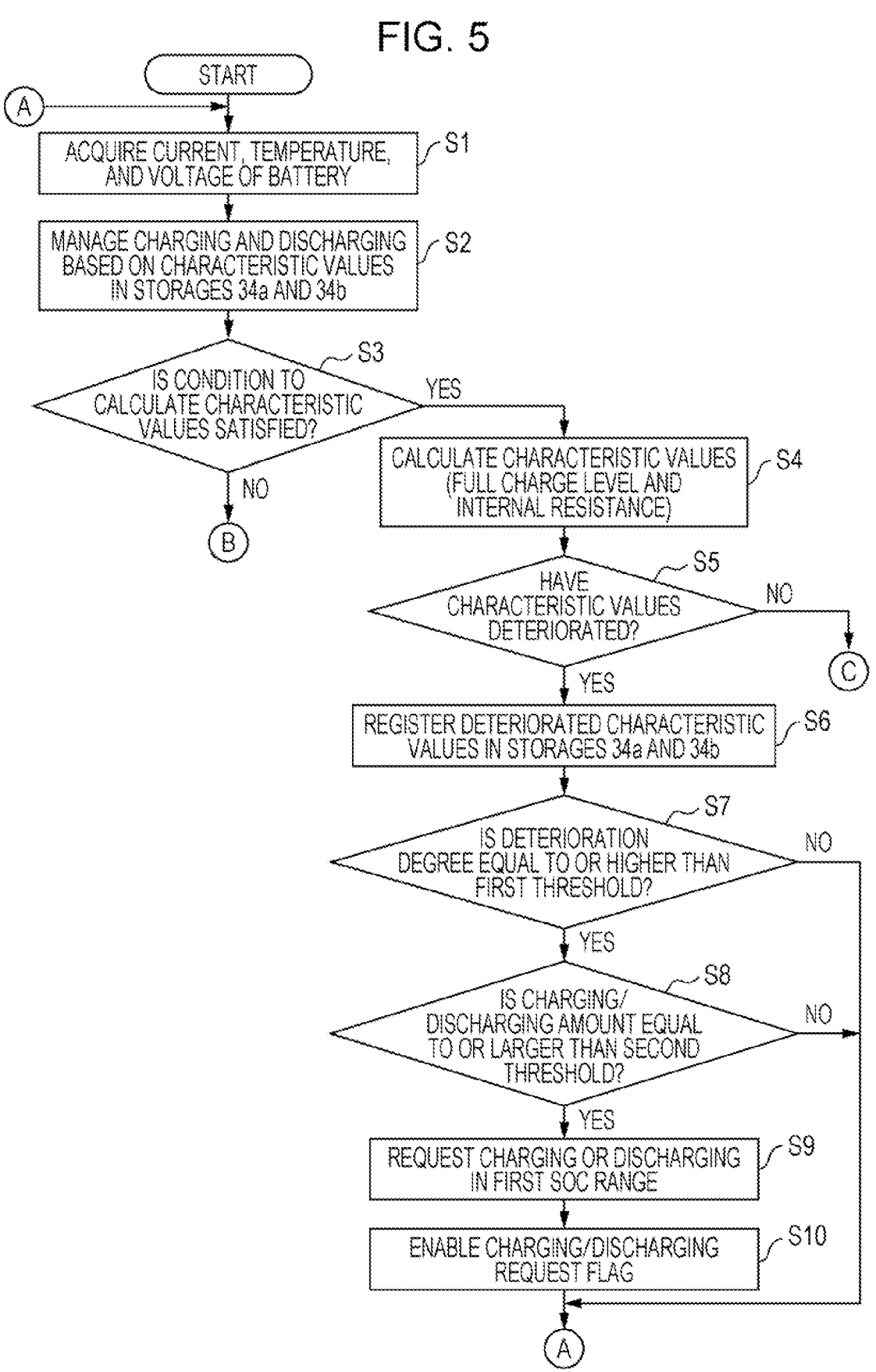
FIG. 5 is a part of a flowchart illustrating a charging/discharging management process to be executed by a controller.
Figure 6:
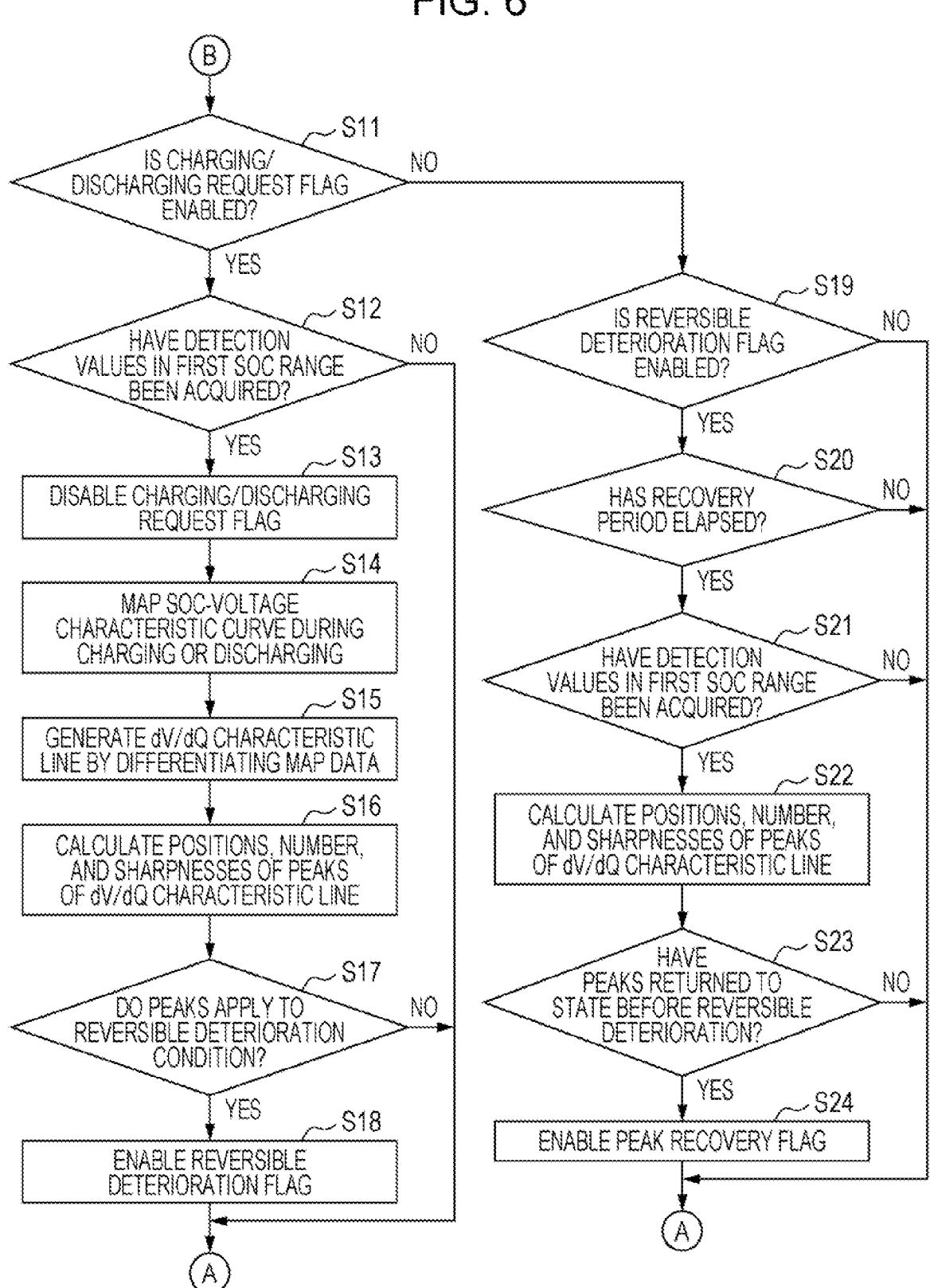
FIG. 6 is another part of the flowchart of FIG. 5.
Figure 7:
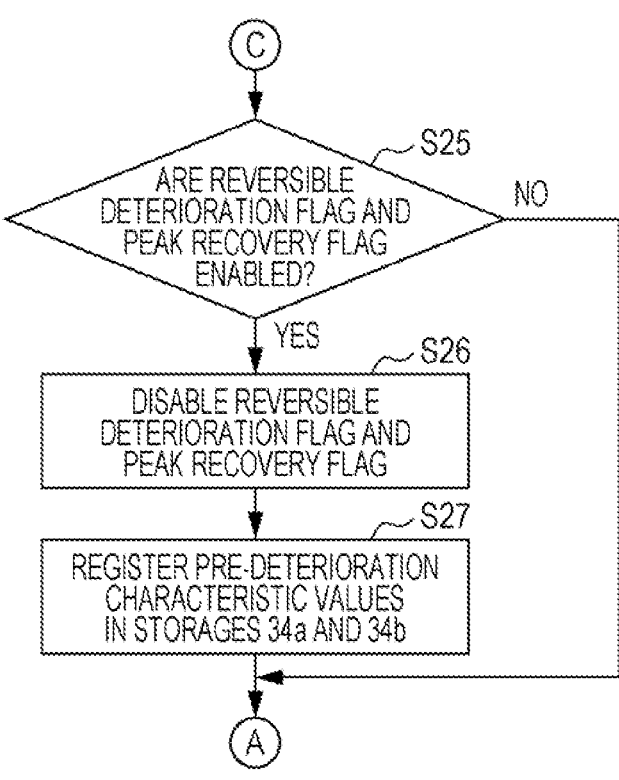
FIG. 7 is the remaining part of the flowchart of FIG. 5.

Description is made about a detailed example of a charging/discharging management process to be executed by the controller. FIGS. 5 to 7 are flowcharts illustrating the charging/discharging management process.

In the charging/discharging management process, the controller 34 repeats Steps S1 and S2 in a loop of Steps S1 to S3, S11, and S19. The controller 34 acquires values of the current, temperature, and voltage of the battery 14 from an output of the detector 32 (Step S1), and manages the charging and discharging based on the characteristic values in the storages 34*a* and 34*b* (Step S2). When a discharging or charging request is received from the vehicle controller 21 in the management in Step S2, the controller 34 determines permission or forbiddance for the charging or discharging so that the charging or discharging is not performed beyond the performance, and replies to the vehicle controller 21 about the determination.

In the loop described above, the controller 34 determines whether a condition to calculate the characteristic values (full charge level and internal resistance) is satisfied (Step S3). When the result is "NO", the controller 34 determines whether a charging/discharging request flag for the first SOC range D1 is enabled (Step S11), and determines whether a reversible deterioration flag is enabled (Step S19). When both the results of the determination in Steps S11 and S19 are "NO", the controller 34 returns the process to Step S1.

Examples of the condition to calculate the characteristic values include a condition that detection values enough to determine the full charge level have been collected by repeatedly acquiring the detection values in Step S1, and a condition that detection values enough to determine an average value of the internal resistance by statistical processing have been collected. Any other condition such as a condition that a predetermined period (use period of the battery 14) has elapsed or the charging or discharging in a predetermined electrical quantity has been performed since the previous calculation of the characteristic values may be added as the calculation condition.

When the result of Step S3 is "YES" in the loop described above, the controller 34 calculates the characteristic values (full charge level and internal resistance) based on the collected detection values of the current, temperature, and voltage (Step S4). The controller 34 determines whether the characteristic values have deteriorated from the previous values (Step S5). When the result is "YES", the controller 34 registers the deteriorated characteristic values in the storages 34*a* and 34*b* (Step S6). Through the update of the registered values, the charging and discharging are managed by using the updated characteristic values in Step S2 of the subsequent process.

The controller 34 determines whether the deterioration degree of the characteristic values is equal to or higher than a first threshold (Step S7). When the deterioration degree is high, the deterioration may be reversible deterioration, and the controller 34 checks the possibility of the reversible deterioration in this step. The controller 34 determines whether charging or discharging in an amount equal to or larger than a second threshold has been performed (or the charging or discharging amount is equal to or larger than the threshold) in a period of the deterioration (Step S8). When excessive charging or discharging is performed or the charging or discharging amount is excessive, the battery 14 may have the reversible deterioration, and the controller 34 checks the possibility of the reversible deterioration in this step. The first threshold and the second threshold are set to values at which the possibility of the reversible deterioration is determined.

When the result of the determination in Step S7 or S8 is "NO", the controller 34 returns the process to the loop from Step S1. When both the results of the determination in Steps S7 and S8 are "YES", the controller 34 sends a request for the charging or discharging in the first SOC range to the vehicle controller 21 (Step S9). The controller 34 enables the charging/discharging request flag indicating that the charging or discharging is being requested (Step S10).

When determination is made in Step S11 of the loop that the charging/discharging request flag is enabled, the controller 34 determines whether the detection values (current, temperature, and voltage) in the first SOC range D1 have been acquired (Step S12). When the result of the determination is "NO", the controller 34 returns the process to the loop from Step S1.

When the charging or discharging in the first SOC range D1 has been performed in response to the request in Step S9 and the result of the determination in Step S12 is "YES", the controller 34 disables the charging/discharging request flag (Step S13). The controller 34 maps an SOC-voltage characteristic curve during the charging or discharging in the first SOC range D1 (Step S14). The controller 34 generates a dV/dQ characteristic line by differentiating the mapped characteristic curve (Step S15). The controller 34 calculates the positions, the number, and the sharpnesses of peaks b that appear in the dV/dQ characteristic line (Step S16), and determines whether those factors apply to a reversible deterioration condition (Step S17). Examples of the condition include a condition that the number of the peaks b has decreased to a number equal to or smaller than a threshold, a condition that the variance among the positions of the peaks b has decreased to a value equal to or smaller than a threshold, and a condition that the sharpness of each peak b has changed toward gentleness to a degree equal to or higher than a threshold.

When the result of the determination in Step S17 is "YES", the controller 34 enables the reversible deterioration flag indicating that the deterioration is the reversible deterioration (Step S18). When the result of the determination in Step S17 is "NO", the controller 34 returns the process to the loop from Step S1.

When determination is made in Step S19 of the loop that the reversible deterioration flag is enabled, the controller 34 determines whether a recovery period (for example, a predetermined constant period) of the reversible deterioration has elapsed (Step S20). When the result is "NO", the controller 34 returns the process to the loop from Step S1. When the result is "YES", the controller 34 determines whether the detection (detection values of the current, temperature, and voltage) in the first SOC range D1 has been performed after the recovery period (Step S21). When the result is "NO", the controller 34 returns the process to the loop from Step S1. When the result is "YES", the controller 34 calculates the positions, the number, and the sharpnesses of peaks b that appear in a dV/dQ characteristic line (Step S22) similarly to Steps S14 to S16. The controller 34 determines whether the number and shape of the peaks b have returned to the number and shape before the reversible deterioration (Step S23). When the result is "NO", the controller 34 returns the process to the loop from Step S1. When the result is "YES", the controller 34 enables a peak recovery flag (Step S24).

When the characteristic values are calculated in Step S4 and the result of the determination in Step S5 is "NO" (the characteristic values are recovered), the controller 34 determines whether the reversible deterioration flag and the peak recovery flag are enabled. When the result is "YES", the controller 34 disables the reversible deterioration flag and the peak recovery flag (Step S26), and registers the pre-deterioration characteristic values (that is, the recovered characteristic values) in the storages 34a and 34b (Step S27). The pre-deterioration characteristic values in Step S27 may be the characteristic values calculated before the determination that the deterioration is the reversible deterioration, or may be the characteristic values newly calculated and recovered from the previous characteristic values. When the result of the determination in Step S25 is "NO" or when the registration in Step S27 is performed, the controller 34 returns the process to the loop from Step S1. Through the update of the registered values in Step S27, the charging and discharging are managed by using the recovered characteristic values in Step S2 of the subsequent process. That is, the performance of the battery 14 can be exerted sufficiently.

A program of the charging/discharging management process is stored in a non-transitory computer readable medium such as a storage 34e of the controller 34. The controller 34 may read a program stored in a portable non-transitory computer readable medium and execute the read program. The portable non-transitory computer readable medium may store the program of the charging/discharging management process.

Charging/Discharging Control

Figure 8:
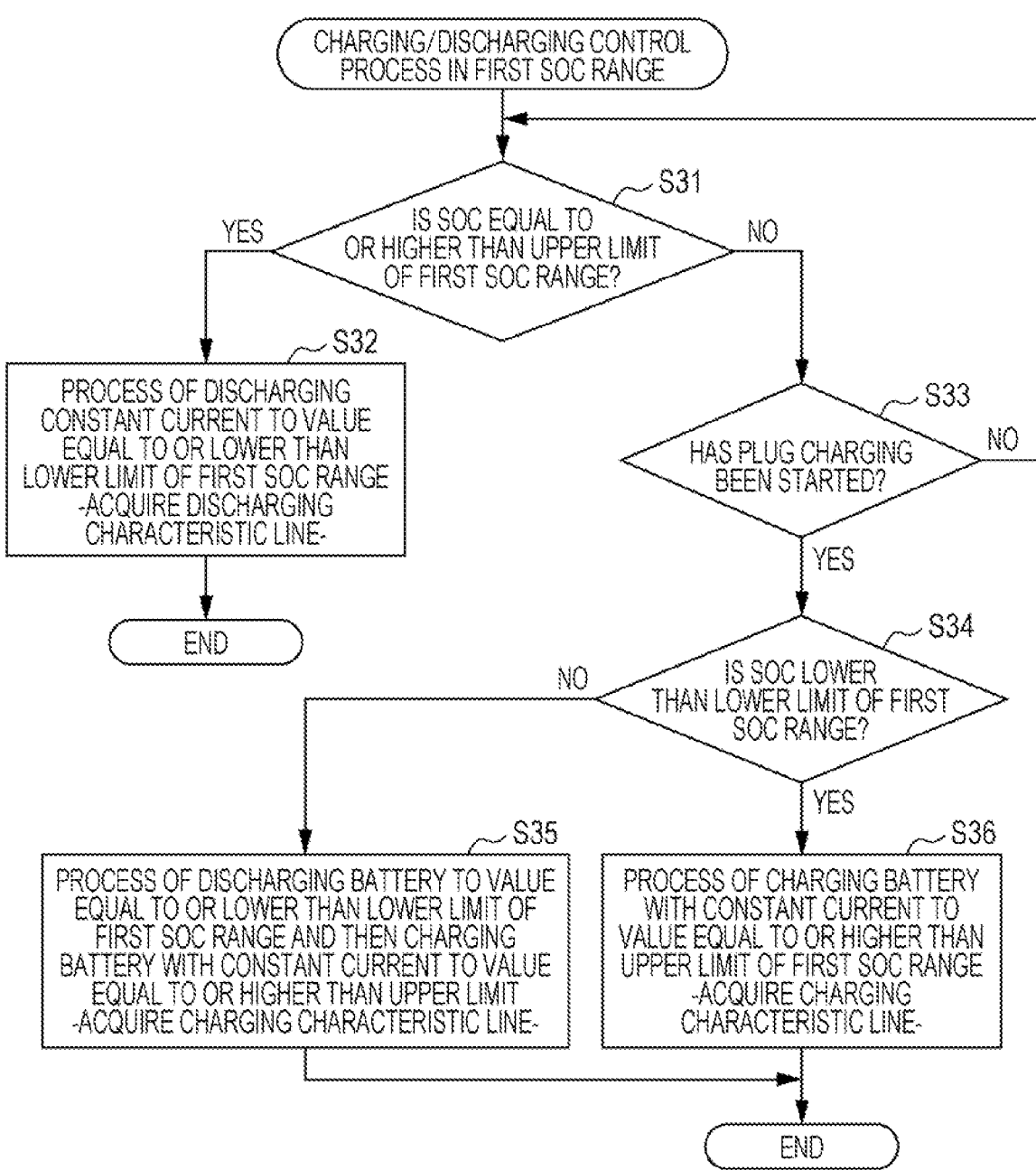
FIG. 8 is a flowchart illustrating a control process to be executed based on a charging/discharging request in a first SOC range.

FIG. 8 is a flowchart illustrating a control process to be executed based on a charging/discharging request in the first SOC range. The control process is executed by the vehicle controller 21 based on the request in Step S9 of FIG. 5. Alternatively, the control process of FIG. 8 may be executed by the controller 34 of the battery management device 30 based on the request.

In response to the request, the vehicle controller 21 determines whether the SOC of the battery 14 is equal to or higher than an upper limit of the first SOC range D1 (see FIGS. 3 and 4) (Step S31). When the result is "YES", the vehicle controller 21 drives the traveling motor 11 or the electric devices 16 to discharge a constant current to a value equal to or lower than the lower limit of the first SOC range D1 (Step S32). Through Step S32, the battery 14 is stably discharged in the first SOC range D1, and the controller 34 of the battery management device 30 can acquire a discharging characteristic line in the first SOC range D1. The constant-current discharging need not be discharging of a strict constant current, and may be stable discharging to the extent that the peaks b in the dV/dQ characteristic line can be detected properly.

When the result of the determination in Step S31 is "NO", the vehicle controller 21 determines whether plug charging has been started (Step S33). When the result is "NO", the vehicle controller 21 returns the process to Step S31. The plug charging means that the battery 14 is charged by acquiring electric power via a power cable from the outside of the electric vehicle 1. Charging of the battery 14 by stable power generation using an internal combustion engine or wireless charging of a power reception coil of the electric vehicle 1 from a power transmission coil of ground equipment may be applied instead of the plug charging in Step S33.

When the result of the determination in Step S33 is "YES", the vehicle controller 21 determines whether the SOC of the battery 14 is lower than the lower limit of the first SOC range D1 (Step S34). When the result is "YES", the vehicle controller 21 performs constant-current charging to the upper limit of the first SOC range D1 (Step S36). Through this charging, the battery 14 is stably charged in the first SOC range D1, and the controller 34 of the battery management device 30 can acquire a charging characteristic line in the first SOC range D1.

When the result in Step S34 is "NO", the vehicle controller 21 temporarily performs discharging until the SOC of the battery 14 reaches a value equal to or lower than the lower limit of the first SOC range, and then performs constant-current charging to a value equal to or higher than the upper limit of the first SOC range (Step S35). Through this charging, the battery 14 is stably charged in the first SOC range D1, and the controller 34 of the battery management device 30 can acquire a charging characteristic line in the first SOC range D1. The discharging in Step S35 may be discharging to external charging equipment (power grid), discharging to the electric devices 16 of the electric vehicle 1, or discharging to an external electric device coupled to the electric vehicle 1. The constant-current charging in Steps S35 and S36 need not be charging with a strict constant current, and may be stable charging to the extent that the peaks b in the dV/dQ characteristic line can be detected properly.

Through the charging/discharging control process described above, when the battery 14 may have the reversible deterioration and the controller 34 of the battery management device 30 requests charging or discharging in the first SOC range D1, stable charging or discharging in the first SOC range D1 can be performed promptly.

A program of the charging/discharging control process is stored in a non-transitory computer readable medium such as a storage 21a of the vehicle controller 21. The vehicle controller 21 may read a program stored in a portable non-transitory computer readable medium and execute the read program. The portable non-transitory computer readable medium may store the program of the charging/discharging control process. When the controller 34 of the battery management device 30 executes the charging/discharging control process, the vehicle controller 21 may be replaced with the controller 34 in the above description.

According to the battery management device 30 of this embodiment, when the characteristic values of the battery 14 have deteriorated, the controller 34 determines whether the deterioration of the characteristic values is the reversible deterioration based on the output of the detector 32. When determination is made that the deterioration is the reversible deterioration, the controller 34 returns the characteristic values to the values before the deterioration. Thus, when the characteristic values of the battery 14 are recovered after the reversible deterioration, the charging and discharging are managed by using the recovered characteristic values, and the performance of the battery 14 can be exerted sufficiently. Through the determination as to whether the deterioration is the reversible deterioration, the characteristic values are returned to the values before the deterioration (recovered values) by distinguishing the case where the characteristic values seem to be recovered due to errors. Thus, it is possible to suppress the charging or discharging beyond the performance of the battery 14.

According to the battery management device 30 of this embodiment, the battery 14 under the management has the characteristic that the multiple peaks b appear in the dV/dQ characteristic line in the first SOC range D1. The controller 34 determines whether the deterioration of the characteristic values is the reversible deterioration based on the output of the detector 32 in the first SOC range D1. For example, the controller 34 determines that the deterioration of the characteristic values is the reversible deterioration based on the fact that the number of the peaks in the dV/dQ characteristic line has decreased compared with that in the comparison reference or that the peaks are gentler than those in the comparison reference. With this determination method, the controller 34 can determine more accurately whether the deterioration is the reversible deterioration. The method for determining whether the deterioration is the reversible deterioration may be any other method depending on the characteristics of the battery 14.

According to the battery management device 30 of this embodiment, the controller 34 requests the vehicle controller 21 to perform discharging or charging in the first SOC range D1 based on the advance of the deterioration of the characteristic values. Thus, when there is a possibility of the reversible deterioration, the controller 34 can determine more accurately whether the deterioration is the reversible deterioration by promptly acquiring the discharging characteristic line or the charging characteristic line in the first SOC range D1.

According to the battery management device 30 of this embodiment, when determination is made that the deterioration of the characteristic values is the reversible deterioration, the controller 34 calculates the characteristic values again and returns the characteristic values to the values before the deterioration under the condition that the characteristic values are recovered. Through this recheck process, it is possible to reduce such inconvenience that the characteristic values are returned to the recovered values though the characteristic values are not recovered in actuality.

The embodiment of the disclosure has been described above. The embodiment of the disclosure is not limited to the embodiment described above. For example, in the charging/discharging management process of FIGS. 5 to 7, the controller 34 returns the characteristic values to the recovered values in Steps S21 to S24 under the condition that the peaks b in the dV/dQ characteristic line are recovered. The controller 34 may return the characteristic values to the recovered values without checking the recovery of the peaks b. When determination is made that the deterioration is the reversible deterioration without checking the recovery of the characteristic values, the controller 34 may return the characteristic values to the values before the deterioration after the elapse of the recovery period. In the embodiment described above, the battery management device 30 manages the charging and discharging based on the comprehensive characteristic values of one battery 14. The battery management device according to the embodiment of the disclosure may manage the charging and discharging of the entire battery or battery cells of one battery based on characteristic values of the individual battery cells. The details of the embodiment may be modified as appropriate without departing from the gist disclosed herein.

According to the embodiment of the disclosure, when the characteristic values indicating the performance of the battery have reversible deterioration and the characteristic values of the battery are recovered afterward, the controller can return the characteristic values to the values before the deterioration. Thus, it is possible to avoid the case where the characteristic values are kept at the values during the deterioration. Accordingly, the performance of the battery can be exerted sufficiently.

The controller 34 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 34. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invenetion claimed is:

1. A battery management device to be mounted on an electric vehicle comprising a driving wheel, a traveling motor configured to generate a driving force for the driving wheel, and a battery configured to store electric power to be consumed by the traveling motor, the battery management device comprising:

a detector configured to detect a state of the battery; and a controller configured to:

calculate, repeatedly, a characteristic value indicating performance of the battery based on an output of the detector;

in response to calculating of the characteristic value, store the calculated characteristic value;

in response to storing of the characteristic value, determine a dV/dQ characteristic line that indicates a relationship between a state of charge (SOC) of the battery and dV/dQ of the battery;

determine whether one or more peaks exist within a predetermined SOC range of the dV/dQ characteristic line, each of the one or more peaks being a point on the dV/dQ characteristic line at which the value of dV/dQ changes from increasing to decreasing;

in response to determining that the one or more peaks exist within the predetermined SOC range of the dV/dQ characteristic line, manage charging and discharging of the battery based on a first characteristic value, the first characteristic value being the last stored characteristic value; and in response to determining that the one or more peaks do not exist within the predetermined SOC range of the dV/dQ characteristic line, manage the charging and the discharging of the battery based on a second characteristic value, the second characteristic value being (i) the characteristic value stored before the first characteristic value or (ii) the characteristic value calculated after a predetermined time or longer has elapsed from a determination that the one or more peaks do not exist within the predetermined SOC range of the dV/dQ characteristic line.

2. The battery management device for the electric vehicle according to claim 1, wherein the controller is further configured to:

determine whether a difference between the first characteristic value and a third characteristic value is equal to or greater than a predetermined first threshold, the third characteristic value being the characteristic value stored before the last stored characteristic value;

in response to determining that the difference is equal to or greater than the predetermined first threshold, perform determination of the dV/dQ characteristic line; and in response to determining that the difference is not equal to or greater than the predetermined first threshold, skip the determination of the dV/dQ characteristic line.

3. The battery management device for the electric vehicle according to claim 2, wherein the controller is further configured to:

even when the controller determines that the one or more peaks exist within the predetermined SOC range of the dV/dQ characteristic line, when a number of the one or more peaks is smaller than a predetermined second threshold, manage charging and discharging of the battery based on the second characteristic value instead of the first characteristic value.

4. The battery management device for the electric vehicle according to claim 2, wherein the controller is further configured to:

even when the controller determines that the one or more peaks exist within the predetermined SOC range of the dV/dQ characteristic line, when sharpness of each of the one or more peaks is gentler than a predetermined third threshold, manage the charging and the discharging of the battery based on the second characteristic value instead of the first characteristic value.

5. The battery management device for the electric vehicle according to claim 1, wherein the controller is further configured to:

even when the controller determines that the one or more peaks exist within the predetermined SOC range of the dV/dQ characteristic line, when a number of the one or more peaks is smaller than a predetermined second threshold, manage charging and discharging of the battery based on the second characteristic value instead of the first characteristic value.

6. The battery management device for the electric vehicle according to claim 1, wherein the controller is further configured to:

even when the controller determines that the one or more peaks exist within the predetermined SOC range of the dV/dQ characteristic line, when sharpness of each of the one or more peaks is gentler than a predetermined third threshold, manage the charging and the discharging of the battery based on the second characteristic value instead of the first characteristic value.

7. A battery management device to be mounted on an electric vehicle comprising a driving wheel, a traveling motor configured to generate a driving force for the driving wheel, and a battery configured to store electric power to be consumed by the traveling motor, the battery management device comprising circuitry configured to:

detect a state of the battery;

calculate, repeatedly, a characteristic value indicating performance of the battery based on the state of the battery;

in response to calculating of the characteristic value, store the calculated characteristic value;

in response to storing of the characteristic value, determine a dV/dQ characteristic line that indicates a relationship between a state of charge (SOC) of the battery and dV/dQ of the battery;

determine whether one or more peaks exist within a predetermined SOC range of the dV/dQ characteristic line, each of the one or more peaks being a point on the dV/dQ characteristic line at which the value of dV/dQ changes from increasing to decreasing;

in response to determining that the one or more peaks exist within the predetermined SOC range of the dV/dQ characteristic line, manage charging and discharging of the battery based on a first characteristic value, the first characteristic value being the last stored characteristic value; and in response to determining that the one or more peaks do not exist within the predetermined SOC range of the dV/dQ characteristic line, manage charging and discharging of the battery based on a second characteristic value, the second characteristic value being (i) the characteristic value stored before the last stored characteristic value or (ii) the characteristic value calculated after a predetermined time or longer has elapsed from a determination that the one or more peaks do not exist within the predetermined SOC range of the dV/dQ characteristic line.

8. A battery management device to be mounted on an electric vehicle comprising a driving wheel, a traveling motor configured to generate a driving force for the driving wheel, and a battery configured to store electric power to be consumed by the traveling motor, the battery management device comprising circuitry configured to:

detect a state of the battery;

determine a first dV/dQ characteristic line that indicates a relationship between a state of charge (SOC) of the battery and dV/dQ of the battery;

store the first dV/dQ characteristic line;

calculate, repeatedly, a characteristic value indicating performance of the battery based on the state of the battery after the first dV/dQ characteristic line is stored;

in response to calculating of the characteristic value, store the calculated characteristic value;

in response to storing of the characteristic value, determine a second dV/dQ characteristic line that indicates the relationship between the state of charge (SOC) of the battery and dV/dQ of the battery;

in response to determining the second dV/dQ characteristic line, determine whether a predetermined condition is satisfied based on a comparison between the stored first dV/dQ characteristic line and the second dV/dQ characteristic line;

in response to determining that the predetermined condition is not satisfied, manage charging and discharging of the battery based on a first characteristic value, the first characteristic value being the last stored characteristic value; and in response to determining that the predetermined condition is satisfied, manage charging and discharging of the battery based on a second characteristic value, the second characteristic value being (i) the characteristic value stored before the last characteristic value or (ii) the characteristic value calculated after a predetermined time or longer has elapsed from a determination that the predetermined condition is satisfied.

9. The battery management device for the electric vehicle according to claim 8, wherein the circuitry is further configured to:

detect one or more first peaks existing within a predetermined SOC range of the first dV/dQ characteristic line;

detect one or more second peaks existing within the predetermined SOC range of the second dV/dQ characteristic line; and when (i) a number of the one or more second peaks is smaller than a number of the one or more first peaks, and/or (ii) sharpness of each of the one or more second peaks is gentler than sharpness of each of the one or more first peaks, determine that the predetermined condition is satisfied.

10. The battery management device for the electric vehicle according to claim 9, wherein the circuitry is further configured to:

determine whether a difference between the first characteristic value and a third characteristic value is equal to or greater than a predetermined first threshold, the third characteristic value being the characteristic value stored before the last stored characteristic value;

in response to determining that the difference is equal to or greater than the predetermined first threshold, perform determination of the second dV/dQ characteristic line; and in response to determining that the difference is not equal to or greater than the predetermined first threshold, skip the determination of the second dV/dQ characteristic line.

11. The battery management device for the electric vehicle according to claim 8, wherein the circuitry is further configured to:

determine whether a difference between the first characteristic value and a third characteristic value is equal to or greater than a predetermined first threshold, the third characteristic value being the characteristic value stored before the last stored characteristic value;

in response to determining that the difference is equal to or greater than the predetermined first threshold, perform determination of the second dV/dQ characteristic line; and in response to determining that the difference is not equal to or greater than the predetermined first threshold, skip the determination of the second dV/dQ characteristic line.

* * * * *